Jan. 2, 1940.  C. F. BAISCH  2,185,324

BRAKE MECHANISM

Filed March 23, 1936  2 Sheets-Sheet 1

INVENTOR
CARL F. BAISCH
BY
ATTORNEYS

Jan. 2, 1940. C. F. BAISCH 2,185,324
BRAKE MECHANISM
Filed March 23, 1936 2 Sheets-Sheet 2
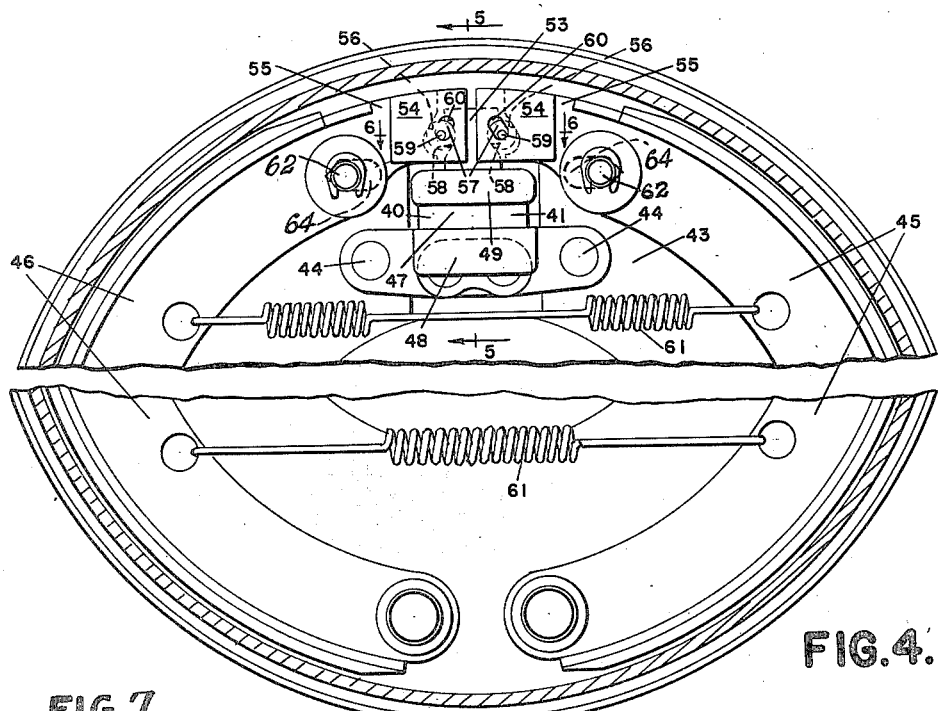
FIG. 4.
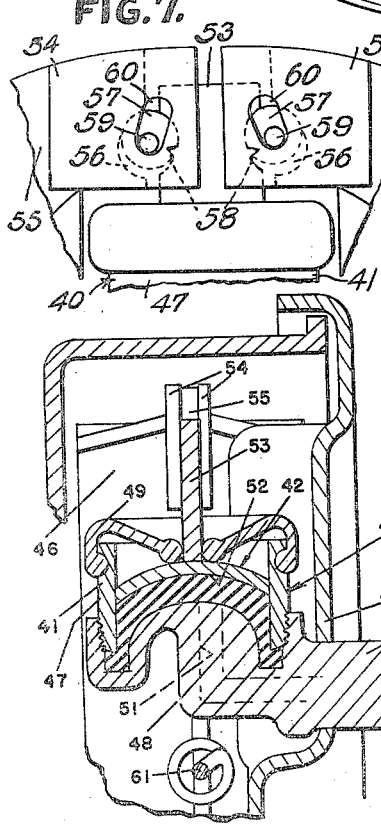
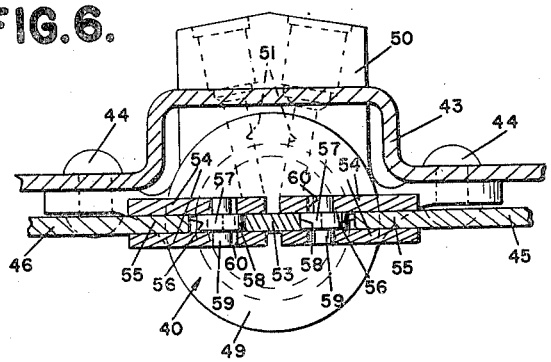
FIG. 6.
FIG. 5.
INVENTOR
CARL F. BAISCH
BY *Whittemore Hulbert Whittemore & Belknap*
ATTORNEYS Patented Jan. 2, 1940

2,185,324

UNITED STATES PATENT OFFICE 2,185,324

BRAKE MECHANISM

Carl F. Baisch, Detroit, Mich., assignor to Kelsey-Hayes Wheel Company, Detroit, Mich., a corporation of Delaware Application March 23, 1936, Serial No. 70,512

7 Claims. (Cl. 188—152)

This invention relates generally to brake mechanisms and refers more particularly to improvements in hydraulic brake actuators.

One of the principal objects of this invention resides in the provision of a hydraulically operated brake mechanism embodying an element forming a part of the hydraulic actuator and constituting means for moving the brake friction means outwardly into engagement with the brake flange. More particularly, this invention contemplates a brake of the above character wherein either the cylinder or piston of the hydraulic actuator forms a wedge for moving the brake friction means into engagement with the brake flange of the drum.

The foregoing, as well as other objects, will be made more apparent as this description proceeds, especially when considered in connection with the accompanying drawings, wherein:

Figure 4 is a side elevational view of a modified form of brake mechanism;

Figure 5 is a sectional view taken substantially on the plane indicated by the line 5—5 of Figure 4;

Figure 6 is a sectional view taken substantially on the plane indicated by the line 6—6 of Figure 4; and Figure 7 is a detailed view of a portion of the actuating means for the shoes.

Figure 1:
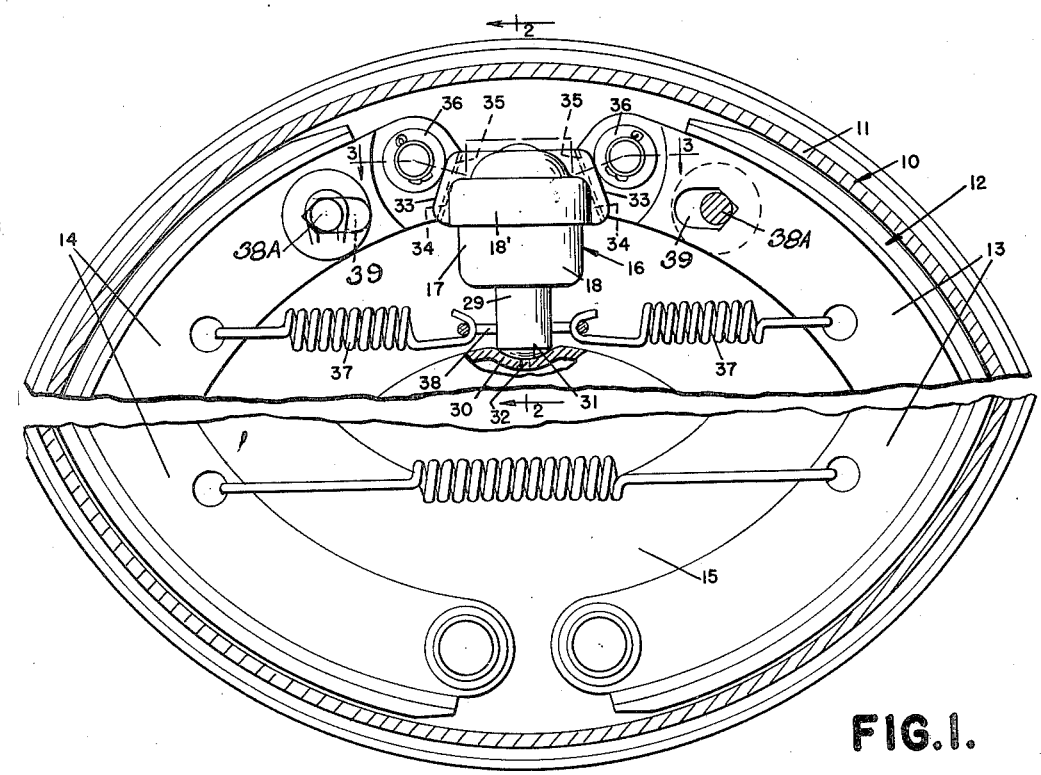
Figure 1 is a side elevation, partly in section, of brake mechanism constructed in accordance with this invention.
Figure 3:
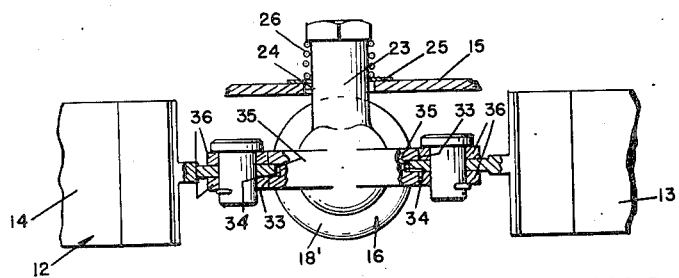
Figure 3 is a sectional view taken substantially on the plane indicated by the line 3—3 of Figure 1.
Figure 2:
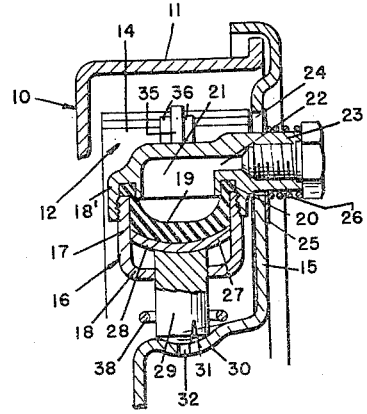
Figure 2 is a sectional view taken substantially on the plane indicated by the line 2—2 of Figure 1.

The brake mechanism shown in Figures 1 to 3 inclusive comprises a brake drum 10 having a brake flange 11 adapted to be engaged by a brake friction means 12 supported within the drum. In the present instance, the brake friction means 12 is in the form of two shoes 13 and 14 having the lower ends spaced from each other and pivotally supported on the backing plate 15 in accordance with the usual practice. The upper ends of the shoes are also spaced from each other and are adapted to be moved outwardly into engagement with the brake flange 11 by means of a hydraulic actuator 16.

The hydraulic actuator 16 comprises a cylinder 17 supported upon the backing plate 15 for radial movement between the upper ends of the shoes. Upon reference to Figure 2, it will be noted that the cylinder 17 comprises a cup-shaped section 18 having its axis extending radially of the drum and normally closed at the upper end by means of a cap 18' threadedly connected thereto. Located within the cylinder 17 is a flexible diaphragm 19 having the marginal edges 20 clamped between the section 18 and the cap 18'. The diaphragm cooperates with the cap in forming a fluid pressure chamber 21 and the latter communicates with a source of fluid under pressure through the medium of an axially extending passage 22 formed in the extension 23 of the cap. The extension 23 of the cap projects through a radially elongated slot 24 in the backing plate 15 to permit limited movement of the cylinder 17 radially of the brake drum. In the present instance, the entrance of foreign matter through the slot 24 is prevented by means of a closure 25 carried by the extension 23 for movement therewith and normally urged into frictional engagement with the outer side of the backing plate 15 by means of a spring 26.

Referring again to Figure 2 of the drawings, it will be noted that a piston 27 is located within the portion of the cylinder 17 spaced radially inwardly from the diaphragm 19. The piston is provided with a head 28 engageable with the diaphragm 19 and is also provided with a stem 29 extending through an opening in the inner end of the cup-shaped member 18 of the cylinder for engagement with an abutment 30. The abutment 30 is in the form of an annular axially extending flange on the backing plate 15 and this flange is depressed as at 31 to provide a recess for receiving the centering pin 32 on the inner end of the stem 29. With the above construction, it will be noted that the piston 27 in the cylinder 17 is prevented from radial inward movement by the action of fluid pressure in the chamber 21 and accordingly, this fluid pressure will effect a movement of the cylinder 17 radially outwardly between the upper ends of the brake shoes.

In the present illustrative embodiment of the invention, the cylinder 17 is actually employed to move the upper ends of the brake shoes outwardly into engagement with the brake flange of the drum and for accomplishing this result, the opposite sides 33 of the cap 19 of the cylinder 17 are inclined from the inner end of the cap toward the axis of the cylinder so that this cap, in effect, forms a wedge. As shown particularly in Figure 1, the sides 33 are grooved as at 34 to slidably receive the correspondingly inclined extremities 35 of the upper ends of the shoes and thereby positions the latter ends of the shoes against axial displacement relative to the drum. It will also be apparent from Figure 1 that a roller 36 is rotatably mounted on each of the upper ends of the shoes for engagement with the surfaces 33 on the cylinder 17 to actually move the brake shoes outwardly into engagement with the brake flange upon radial displacement of the cylinder 17 in an outward direction between said ends. As the cylinder 17 is moved outwardly, the rollers 36 are maintained into engagement with the surfaces 33 on the cylinder 17 by suitable retracting springs 37 having the outer ends respectively anchored to the brake shoes 13 and 14 and having the inner ends connected to a ring 38 encircling the stem 29 of the piston. These springs 37 also cooperate with suitable studs 38A to position the shoes in their retracted or released positions. The studs 38A are fixed to the backing plate 15 and extend through elongated slots 39 formed in the shoes adjacent the actuator ends thereof. It will be noted from Figure 1 that the slots 39 are elongated in directions to permit outward movement of the actuator ends of the shoes, and it will also be observed from this figure that the outer ends of the slots are substantially V-shaped to insure accurate positioning of the shoes on the studs.

The embodiment of the invention shown in Figures 4 to 6 inclusive, differs from the one previously described in that the wedge for actuating the brake friction means, or shoes forms a part of the piston of the hydraulic actuator rather than the cylinder of the latter. In the modified form of the invention shown in Figures 4 to 6 inclusive, the reference character 40 designates a hydraulic actuator comprising a cylinder 41 and a piston 42 slidably mounted in the cylinder. In the present instance, the cylinder 41 is fixedly secured to the backing plate 43 by means of the rivets 44 and the axis of the cylinder extends radially of the brake drum between the upper ends of the brake shoes 45 and 46.

Upon reference to Figure 5, it will be noted that the cylinder comprises an intermediate annular ring 47 having a fitting 48 detachably secured to the inner end thereof and having a flexible cap 49 secured to the outer end thereof. The fitting 48 is provided with an axially extending portion 50 projecting out of the drum through the backing plate 43 and is also provided with a passage 51 therethrough establishing communication between a source of fluid under pressure and the interior of the cylinder 41 at the inner side of the head 52 of the piston 42.

The piston 42 is provided with an extension 53 projecting outwardly through the yieldable cap 49 to a position between the upper ends of the brake shoes. As shown particularly in Figure 4, the extension 53 is in the form of a plate adapted to be guided throughout radial movement thereof by means of the axially spaced plates 54 fixedly secured to the end of the shoes.

Referring now to Figure 6 of the drawings, it will be noted that the web or stem portions of the brake shoes are provided with extensions 55 at the upper ends thereof adapted to be received between the plates 54 on opposite sides of the extension 53 of the piston. The inner edges of the extensions 55 are fashioned with inclined portions 56 for engaging suitable rollers 57 housed between the plates 54 on opposite sides of the extension plate 53 of the piston 42 for engaging correspondingly inclined surfaces 58 on the latter sides of the extension 53. The arrangement is such that radial outward movement of the extension plate 53 transmits a movement of the brake shoes into engagement with the brake flange of the drum through the medium of the rollers 57. In this connection, it may be pointed out that the rollers 57 are mounted for limited floating movement between the plates 54 and in the present instance, are guided to a certain extent by means of pins 59 extending axially from the rollers through elongated slots 60 formed in the plates 54. The major axes of the slots are inclined at an angle corresponding to the inclined portions on the extension 53 and/or upper extremities of the shoes.

With the construction described above, it will be noted that as fluid under pressure is built up in the cylinder 41 at the inner side of the head 52 of the piston 42, the latter, together with the extension 53, is moved radially outwardly. Movement of the extension 53 of the piston 42 outwardly cams the rollers 57 into engagement with the inclined edges 56 on the upper extremities of the shoes for moving the latter outwardly into engagement with the brake flange of the drum. In this connection, it is to be noted that the upper extremities of the brake shoes are yieldably maintained into frictional engagement with the rollers 57 by means of retracting springs 61 having the outer ends connected to the shoes 45 and 46. These springs 61 also cooperate with the studs 62 to position the actuator ends of the shoes in their released positions. The studs 62 are secured to the backing plate 43 of the brake and extend through slots 64 in the actuator ends of the shoes for engagement with the V-shaped outer walls of these slots in the same manner described in connection with the first form of this invention.

Thus, from the foregoing, it will be observed that I have provided a hydraulically operated brake mechanism wherein a part of the hydraulic actuator, such as either the cylinder or piston, is employed as a wedge for moving the brake friction means into engagement with the brake flange. While two specific embodiments of the invention have been shown and described herein, nevertheless, it is to be understood that the invention may be effected by various different constructions and thereby, reservation is made to make such changes in the construction as may come within the purview of the accompanying claims.

What I claim as my invention is:

1. In a brake mechanism, a brake drum having a brake flange, friction means within the drum engageable with said flange and having spaced ends, a hydraulic actuator for the friction means having a cylinder supported for movement radially of the drum between the ends of the friction means and communicating with a source of fluid under pressure at a point adjacent the radially outer end thereof, and a piston fixed against movement with the cylinder and having a head portion at the radially outer end extending into the cylinder and responsive to the action of fluid pressure in the cylinder to effect movement of the latter in the direction aforesaid for moving the ends of the friction means outwardly into engagement with the brake flange.

2. In a brake mechanism, a brake drum having a brake flange, friction means within the drum engageable with said flange and having spaced ends, a hydraulic actuator for the friction means having a cylinder supported for movement in a direction transversely of the friction means between the ends of the latter and having portions of the opposite side walls tapered to form a wedge for moving the ends of the friction means outwardly toward the brake flange of the drum, and a piston fixed against movement with the cylinder and having a head portion at the radially outer end extending into the cylinder and cooperating with fluid pressure admitted to the cylinder radially outwardly from the head portion of the piston to effect movement of the cylinder in the transverse direction aforesaid.

3. In a brake mechanism, a brake drum having a brake flange, friction means within the drum engageable with said flange and having spaced ends, a hydraulic actuator for the friction means having a cylinder supported for movement radially of the friction means between the ends of the latter and having portions of the opposite sides respectively engageable with said ends upon movement of the cylinder radially outwardly to move the friction means into engagement with the brake flange of the drum, and a piston in the cylinder having a head at the radially outer end thereof and having a portion extending inwardly beyond the inner end of the cylinder for engagement with a fixed abutment and cooperating with fluid under pressure admitted to the cylinder at the radially outer side of the head of the piston to move the cylinder radially outwardly.

4. In a brake mechanism, a brake drum having a brake flange, a backing plate for the brake drum having an axially extending portion provided with a depression therein, friction means carried by the backing plate within the drum and having spaced ends located opposite the depression in the backing plate, a hydraulic actuator for the friction means having a cylinder supported for movement radially of the friction means between the ends of the latter and engageable with said ends to move the friction means outwardly relative to the brake drum, and a piston in the cylinder having a portion extending radially inwardly beyond the inner end of the cylinder seated in the depression in the axially extending portion of the backing plate to prevent radially inward movement of said piston.

5. In a brake mechanism, a brake drum having a brake flange, brake friction means within the drum engageable with said flange and having spaced ends extending in a common plane parallel to the plane of rotation of the drum, a hydraulic actuator for the friction means having a cylinder supported for movement radially of the brake drum between the ends of the friction means with the axis thereof located in the plane of the ends of the friction means and having tapered portions on the side walls adjacent said ends forming a wedge engageable with the latter ends to move the friction means outwardly relative to the brake flange, and a piston held against movement axially of the cylinder and having a head portion at the radially outer end extending into the cylinder and cooperating with fluid pressure admitted to the cylinder at a point radially outwardly from the head of the piston to effect movement of the cylinder in a direction to move the friction means outwardly relative to the brake flange.

6. In brake mechanism, a brake drum having a brake flange, brake friction means within the drum engageable with the flange and having spaced ends, a hydraulic actuator for the friction means positioned between the ends of the friction means and comprising a cylinder and a piston having the axes thereof extending generally radially of the drum, means supporting the hydraulic actuator for limited pivotal movement in the plane of rotation of the drum, said cylinder and piston being relatively movable generally radially of the drum in response to fluid pressure admitted to the cylinder, and cam means actuated by relative movement of the cylinder and piston in one direction and engageable with the ends aforesaid of the friction means to operate the friction means.

7. In a brake mechanism, a brake drum, brake friction means supported in the drum for engagement with the latter and having spaced ends, a hydraulic actuator for the friction means comprising a cylinder and a piston positioned between the ends of the friction means with the axes thereof extending radially of the drum and supported for pivotal movement in the plane of rotation of the drum, said cylinder having provision at the radially outer end thereof for receiving fluid under pressure and responsive to the action of the fluid under pressure on the head of the piston to move radially of the drum between the ends of the friction means relative to the piston, and means carried by the cylinder on diametrically opposite sides thereof engageable with the ends of the friction means for actuating the latter.

CARL F. BAISCH.